(No Model.)
J. R. NAGELL.
BICYCLE FRAME.
No. 604,838. Patented May 31, 1898.
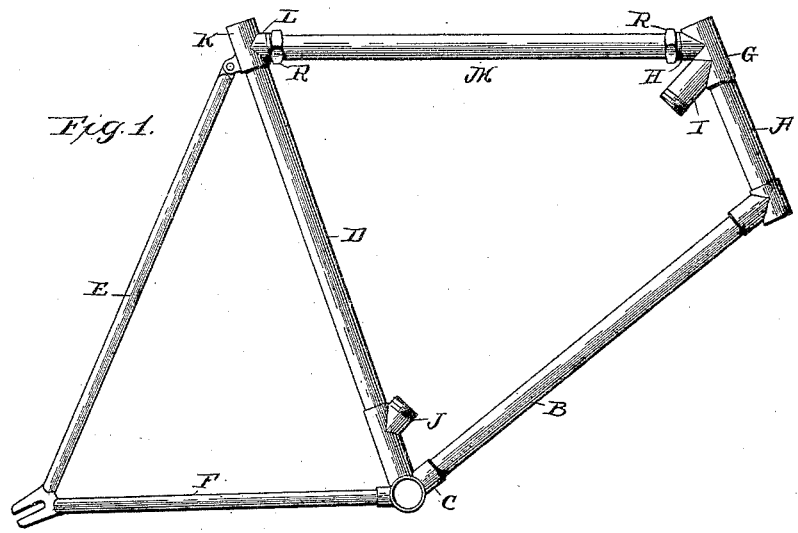
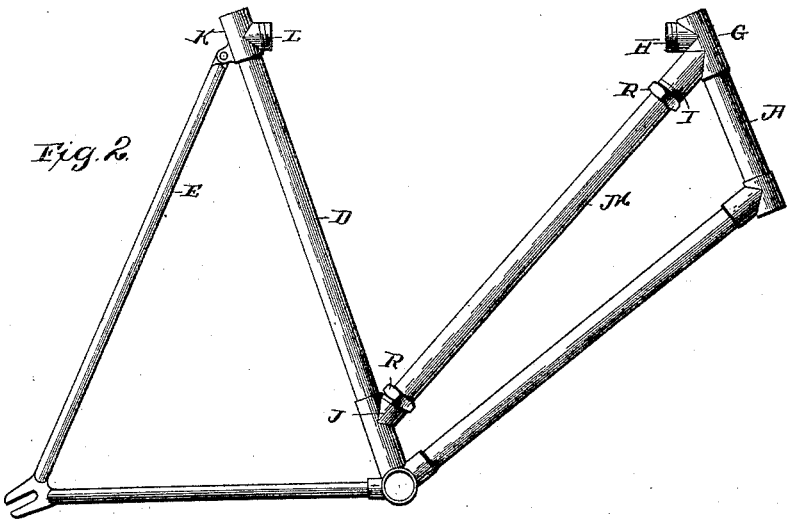
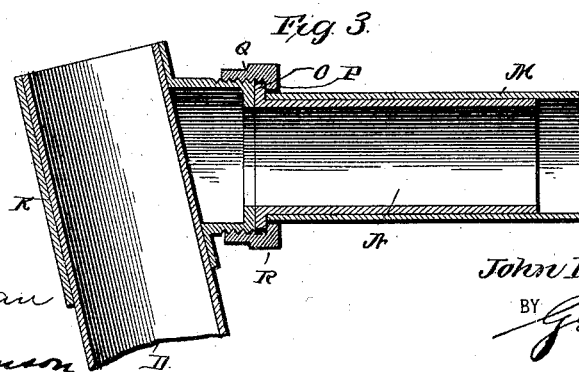
WITNESSES:
E. C. Wurdeman
A. J. Williamson
INVENTOR
John R. Nagell
BY Geo. H. Holgate
ATTORNEY.

UNITED STATES PATENT OFFICE.

JOHN R. NAGELL, OF TACOMA, WASHINGTON.

BICYCLE-FRAME.

SPECIFICATION forming part of Letters Patent No. 604,838, dated May 31, 1898.

Application filed February 4, 1897. Serial No. 621,905. (No model.)

*To all whom it may concern:*

Be it known that I, JOHN R. NAGELL, a citizen of the United States, residing at Tacoma, in the county of Pierce and State of Washington, have invented a certain new and useful Improvement in Bicycle-Frames, of which the following is a specification.

My invention relates to a new and useful improvement in combination bicycle-frames, and has for its object to so construct such a frame that it may be quickly converted from the diamond frame to a drop frame, or vice versa, and when adjusted for either style will be as rigid and true as though it were made for one design only, and an incidental object of my invention is that in converting the frame from one design to another no surplus parts remain to be stored with the possibility of loss, so that when again needed other parts would have to be substituted therefor.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a frame made in accordance with my improvement and illustrating its appearance when adjusted to the diamond shape; Fig. 2, a similar view showing the frame when converted to a drop frame, and Fig. 3 an enlarged section of one of the joints and coupling.

In carrying out this invention I construct the frame with a head A, front lower brace B, crank-hanger C, seat-post tube D, backstay E, and rear brace F of usual design, with the exception that the top lug G of the head has formed therewith the threaded extensions H and I, while the hanger is also provided with a threaded extension J, and the saddle clamp-lug K has thereon a threaded extension L. These extensions form members of the joints which are utilized in securing the top brace-tube M in position. The tube M has secured in each end thereof a bushing N, having a flange O formed upon its outer end, which when in place projects beyond the perimeter of the tube, as clearly shown in Fig. 3, and this flange serves as a bearing for the inturned flange P of the coupling Q, said coupling being placed upon the tube M before the bushing is secured in place within said tube.

The coupling Q has formed thereon a hexagon or other suitably-shaped head R and is threaded internally, so as to enter into engagement with the external threads of the extensions H, I, J, and L, from which it will be seen that the brace-tube M may be secured in the position shown in Fig. 1 by placing it in alinement with the extensions H and L and running the couplings at each end thereof upon the threads of these extensions, the heads of the couplings serving as wrench-holds; also, when the frame is to be converted into a drop frame the brace-tube M is placed in alinement with the extensions I and J and the couplings run upon these extensions in the same manner.

In practice the tube M may be quickly removed from the extensions to which it is attached and secured to the remaining extensions by simply backing off the couplings, as will be readily understood, and when this tube is secured in either position it will render the frame as rigid as though it were formed therewith.

The advantages of a combination-frame are well understood and consist in the facility of so adjusting a bicycle as to render it adaptable for use by either a man or woman.

While I am aware that various constructions have been designed for converting a bicycle-frame I do not broadly lay claim to the same.

What I do claim as new and useful is—

1. In combination with a bicycle-frame hollow tubular lugs arranged one above the other and extending inwardly at different angles from the head, similar lugs formed on the saddle-post tube at the bottom and top thereof, a removable tube of a length to fit between the lugs, and nuts revolubly secured on the ends of said tube, said nuts being threaded internally to fit corresponding external threads formed on the lugs whereby the tube may be fitted between the two upper lugs thereby forming a diamond frame, or between the two lower lugs forming a drop or lady's frame, substantially as described.

2. In a bicycle-frame, joining-lugs at the head, crank-hanger and top of the saddle-post tube having hollow tubular lugs formed thereon, said lugs being threaded externally, a tube of a length to fit between the lugs, and nuts revolubly secured at the ends of said tube, said nuts being threaded internally to fit the threads of said lugs, whereby the tube may be fitted between the two upper lugs forming a diamond-frame wheel or between the two lower lugs forming a drop frame, substantially as described.

In testimony whereof I have hereunto affixed my signature in the presence of two subscribing witnesses.

JOHN R. NAGELL.

Witnesses:
S. S. WILLIAMSON,
H. K. MOORE.